United States Patent [19]
Ishizaki et al.

[11] Patent Number: 6,044,041
[45] Date of Patent: Mar. 28, 2000

[54] RECORDING AND REPRODUCING APPARATUS HAVING A MAGNETO-OPTICAL HEAD WITH AN OBJECTIVE LENS AND LASER-BEAM-PERMEABLE MEMBER

[75] Inventors: Osamu Ishizaki, Suita; Katsusuke Shimazaki, Ibaraki-ken; Toshinori Sugiyama, Tsukuba; Masafumi Yoshihiro, Ibaraki-ken; Susumu Imai, Toride, all of Japan

[73] Assignee: Hitachi Maxell, Ltd., Osaka, Japan

[21] Appl. No.: 08/946,066

[22] Filed: Oct. 7, 1997

[30] Foreign Application Priority Data

Oct. 7, 1996 [JP] Japan .................................. 8-266369

[51] Int. Cl.⁷ .................................................. G11B 11/00
[52] U.S. Cl. .............................................. 369/13; 360/114
[58] Field of Search ........................ 369/13, 112, 44.11, 369/44.14, 44.21, 44.22, 44.23; 300/114, 59

[56] References Cited

U.S. PATENT DOCUMENTS

| | | | |
|---|---|---|---|
| 4,807,204 | 2/1989 | Mizutani et al. ........................ | 369/13 |
| 5,150,338 | 9/1992 | Birecki et al. ............................ | 369/13 |
| 5,197,050 | 3/1993 | Murakami et al. ....................... | 369/13 |
| 5,295,122 | 3/1994 | Murakami et al. ....................... | 369/13 |
| 5,432,763 | 7/1995 | Campbell et al. .................... | 369/44.19 |
| 5,689,480 | 11/1997 | Kino ........................................ | 369/14 |
| 5,712,842 | 1/1998 | Yamamoto et al. .................... | 369/112 |
| 5,828,644 | 10/1998 | Gage et al. ............................ | 369/112 |
| 5,859,814 | 1/1999 | Kino et al. ............................... | 369/13 |

FOREIGN PATENT DOCUMENTS 08-212579  8/1996  Japan .

*Primary Examiner*—Tan Dinh
*Attorney, Agent, or Firm*—Birch, Stewart, Kolasch & Birch, LLP

[57] ABSTRACT

A compact recording and reproducing apparatus includes a floating-type head movable in a fan shape in parallel with the surface of a disk recording medium in order to make faster access to the tracks and to record information at a higher density. A slider and a head are secured to the tip of a swing arm capable of fan-shaped swing movement, and a solid immersion lens is used for the head, so that the light beam can be passed along the arm from the fulcrum at the rotating pivot of the swing arm member.

16 Claims, 17 Drawing Sheets

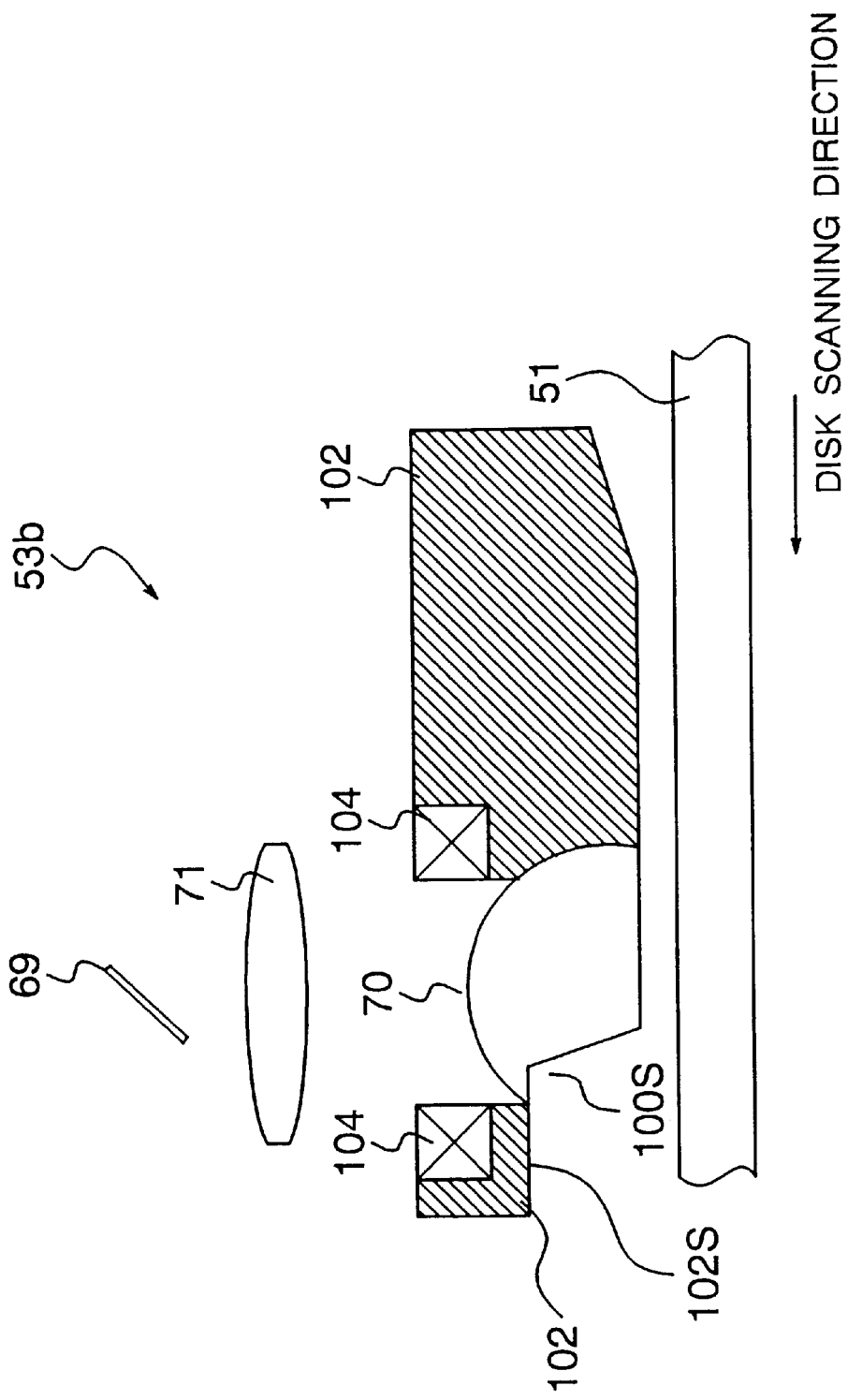

- 160 TAPER PORTION
- 102 SLIDER
- DISK SCANNING DIRECTION
- SLIDING SURFACE OF SLIDER
- 70 SOLID IMMERSION LENS
- ▨ SHALLOW GROOVE

161 CROSS-SECTION OF SLIDER

SIDE OF SLIDER

RECORDING AND REPRODUCING APPARATUS HAVING A MAGNETO-OPTICAL HEAD WITH AN OBJECTIVE LENS AND LASER-BEAM-PERMEABLE MEMBER

BACKGROUND OF THE INVENTION

1. Field of the Invention

This invention generally relates to recording and reproducing apparatus such as magnetooptical recording and reproducing apparatus using a magnetooptical head or the like. More particularly, the present invention relates to a magnetooptical head capable of reducing the diffraction limit of the spot diameter of the laser beam irradiated on a recording medium, and to a recording and reproducing apparatus capable of recording at a higher density by use of the magnetooptical head unit.

2. Description of the Related Art

Recently, as multimedia have become popular, a magnetooptical recording medium which is able to record and reproduce a large amount of data rapidly and at a higher density has attracted a great deal of public attention. For example, which regard to the recording on a magnetooptical recording medium capable of overwrite recording, a laser beam is irradiated on the magnetooptical recording medium, while a magnetic field corresponding to input information is applied to the positions on the medium at which the laser beam has been irradiated. When this magnetooptical recording medium is reproduced, a laser beam weaker than that at the time of recording is applied to the medium, and the polarizing angle of the reflected light from the medium, which has the polarizing angle of the reflected light depending on the recording magnetization direction, is detected so that the information can be reproduced.

As to the head mechanism used in this magnetooptical recording and reproducing apparatus, an optical head 2 and a magnetic head 3 as shown in FIG. 1 have been provided to oppose each other along their center line on both sides of a disk recording medium 1. In this case, since each of the optical head 2 and magnetic head 3 has a large shape and weight, the heads 2, 3 are supported by a support member 7, and moved along the sides of the disk recording medium 1 by the rotation of a screw rotating shaft 4 driven by a drive motor 6, so that the information can be recorded, reproduced or erased. This system has a drawback in that it has a large three-dimensional shape and a large weight. Thus it is not suitable for small-size, light weight, large-capacity, and high-speed access for recording, reproduction and erasion which the disk recording medium and recording and reproducing apparatus are requested to have. On the other hand, a magnetooptical head mechanism 20 as shown in FIG. 2 is known as the technology for combining the optical head 2 and magnetic head 3 into one unit, thereby reducing the size of the recording and reproducing apparatus. That is, a drive 13 for an object lens 10 of an optical head system 12 and a magnetic head/slider 14 in which a magnetic head coil 21 is provided are integrally combined. The magnetic head/slider 14 has an aperture 43 formed therethrough for focused light 32 of a laser beam 11 emitted from the optical head. The recording and reproducing apparatus using this kind of magnetooptical head is considerably small in its solid volume, but still not satisfactory enough to meet the small-size, light weight, large-capacity, and high-speed access for recording, reproduction and erasion which the disk recording medium and recording and reproducing apparatus of today are requested to have.

In addition, another system is known in which the head is secured to the tip of an arm with its fulcrum positioned around the disk recording medium. The arm is swung in parallel to the surface of the disk recording medium, thereby recording, reproducing or erasing information on or from the disk recording medium. The drive system for moving the optical head in parallel to the surface of the disk recording medium by a swing arm or linear motor is proposed in Japanese Patent Laid-open Gazette No. 5-54457. The system for driving an optical head by a swing arm is also proposed in Japanese Patent Laid-open Gazettes Nos. 8-7309 and 3-203848. Moreover, the construction having a laser beam reflecting surface formed on the magnetic head is disclosed in Japanese Patent Laid-open Gazette No. 3-280233. The problem with this system is that it is not able to achieve the suitable small size and light weight which the recording and reproducing apparatus of today is requested to have. The recording and reproducing drive capable of answering the remarkable demand for small size and high-density recording capability of a magnetooptical recording medium must be more compact, lighter in weight, and have higher-speed access for recording, reproduction and erasion. If the optical head and magnetooptical head are driven by the known swing arm system, the heads will hit the disk recording medium, causing head crash with the result that the head and disk recording medium are broken, or destroyed.

SUMMARY OF THE INVENTION

The recording and reproducing drive is required to have a small volume, be as compact as possible, make much faster access for the recording, reproduction and erasing, and have high-performance recording, reproducing and erasing functions capable of reading, recording and erasing more highly fine information signal pits, magnetic domains or domain signals on from the recording medium than in the prior art. In addition, the head unit should be light in weight, and as a result the weight of the whole recording and reproducing drive must be light. In this connection, recording media such as magnetooptical disks are also required to have smaller diameters, light weights, higher recording capacities capable of recording at higher densities, and higher performance functions to record, reproduce and erase at a higher speed. These features have been gradually developed so far. The important thing for reducing the volume of the recording and reproducing drive is to decrease the thickness of the drive. In order to achieve this object, it is necessary that the record/reproduce head for the access to the magnetooptical disk be chiefly moved in parallel to the recording surface of the magnetooptical disk, and moved as little as possible in the perpendicular direction relative to the recording surface of the magnetooptical disk or reduce the volume to a minimum. Also, in order to make the access of the record/reproduce head to the recording medium more rapid, it is necessary to use a head mechanism capable of quick movement, and to control the record/reproduce head and magnetooptical disk to prevent collision, or crashing with each other.

Accordingly, it is an object of the invention to provide a recording and reproducing drive apparatus capable of recording, reproducing and erasing a large amount of information at high speed on/from a disk-like information recording medium that is able to record information at a high density, and particularly a recording and reproducing drive apparatus having a swing arm of which the tip end has securely mounted thereon an optical head or a magnetooptical head produced by combining an optical head and a magnetic head into a unitary body. The swing arm/head according to the invention is mounted at the fulcrum near the outer periphery of the disk recording medium loaded in the recording and reproducing drive apparatus. Thus, this swing arm/head functions to pivotally move around this fulcrum in a fan shape in parallel to the recording surface of the disk recording medium, and to record/reproduce/erase information on/from the disk recording medium. The swing arm/ optical head or swing arm/magnetooptical head according to the invention is a head mechanism that has the function to irradiate an extremely fine "laser beam spot" unit signal or a highly fine "magnetic field" unit signal to a small-sized high-density recording disk medium to fast record/ reproduce/erase a high-density information signal such an ultra-fine "pit" unit signal or ultra-fine "magnetic domain or domain" unit signal or to fast make information processing for record/reproduce/erase operation on this high-density information signal. The recording and reproducing apparatus of the invention has a swing arm that is formed of at least a head unit, swing arm portions, and an optical beam splitter. In addition, the head unit is securely mounted to the tip end of the swing arm with its swing driving pivot located near the outer periphery of the recording medium loaded in the recording and reproducing apparatus. Also, the head unit is formed of an object lens drive and a laser-beam-permeable member of which the center coincides with the center line of an object lens. The laser-beam-permeable member of the head unit may be formed by a head slider having a head floating function. The recording medium to be loaded in the recording and reproducing apparatus of the invention can be selected from an optical recording medium, a magnetooptical recording medium, a magnetic recording medium for making optical beam tracking, and so on. Particularly, the optical disk recording medium, magnetooptical disk recording medium and magnetic recording medium for making optical beam tracking are suitable for use with the recording and reproducing apparatus of the invention. Of the recording and reproducing apparatus of the invention, the magnetooptical recording and reproducing apparatus has provided therein a swing arm that is formed of at least a head unit, a slider, swing arm portions, and an optical beam splitter. The head unit has a swing driving pivot provided near the outer periphery of the magnetooptical disk loaded in the magnetooptical recording and reproducing apparatus. In addition, the head unit securely mounted on the tip of the arm is formed of an object lens drive, a head slider having a laser-beam-permeable member of which the center coincides with the center line of the object lens, and a magnetic coil. If a solid immersion lens is fixedly provided in the laser-beam-permeable member of which the center coincides with the center line of the object lens of the head unit, such an effect can be obtained as to be able to read, write and erase extremely fine information pits, information magnetic domain signal, information domain signal and so on/from the recording layer of the recording medium. Moreover, the recording and reproducing apparatus of the invention has a swing arm which is formed of at least a head unit, a slider, swing arms and a light beam splitter. This head unit is fixedly mounted on the disk-side tip end of the balance-shaped swing arm having a swing driving pivot provided near the outer periphery of the disk recording medium loaded in the recording and reproducing apparatus. A signal detection unit for the disk recording medium may be securely mounted on the other end of the balance-shaped swing arm.

The swing arm/head according to the invention may be adapted so that the whole arm/head or only the head unit of the swing arm which is mounted at the fulcrum near the outer periphery of the disk recording medium loaded in the recording and reproducing apparatus records/reproduces/ erases information on from the disk recording medium while it is being linearly moved from the fulcrum on the swing arm in parallel to the recording surface of the disk recording medium in substantially the diameter direction of the disk recording medium. This driving means for linearly moving this head is a linear motor.

The swing arm or the head unit mounted on the arm has the function to cause a negative or positive pressure in the air circulated by convection while the disk recording medium is being rotated, thereby floating the head unit itself. The head unit is formed of a head slider with a portion provided to cause the light beam spot to pass therethrough, a magnetic coil or film-shaped magnetic coil, an object lens drive, and a laser beam reflecting mirror. The portion of the head slider for allowing the laser beam to pass therethrough may be an aperture, a transparent ceramic member or a transparent resin material formed in the path. Also, a hemispherical transparent lens or solid immersion lens can be fixedly provided near this laser beam permeable portion.

The swing arm/head or head unit mounted on the arm according to the invention not only makes tracking the information recording area of the disk recording medium by irradiating a laser beam thereon from the optical head and records/reproduces/erases an information signal on/from the area, but also has the function to control the amount of floating of the swing arm and the focusing necessary for the recording/reproducing/erasing of the information signal. In particular, the swing arm/head or head unit controls the object lens drive and prevents the swing arm/head from being crashed.

The magnetooptical head unit of the invention, since the magnetic coil is incorporated in the slider, can be smaller in size than in the prior art. In addition, since the magnetic coil is disposed on the outer periphery of the optical element 101, the distance between the recording medium and the magnetic coil is decreased. Therefore the current flowing in the magnetic coil can be reduced when it produces a magnetic field. Thus, since the path along which the laser beam is irradiated is not blocked, the laser beam can be effectively irradiated on the recording medium. Since the magnetic coil is located at a position near to the recording medium away from the light-exiting surface of the optical element 101, the magnetic coil is close to the recording medium, thus suppressing the consumption power of the recording and reproducing apparatus using this magnetooptical head unit. The magnetic coil should be made of a film-like coil. Since the magnetic coil is constructed with a film-shaped coil, the distance between the recording medium and the magnetic coil can be reduced. Moreover, if the inner diameter of the magnetic coil is reduced to be smaller than the outer diameter of the optical element 101, the magnetic coil can apply a more stable magnetic field to the recording medium.

The magnetic core should be made of a magnetic material that is permeable to light. Thus, since the laser beam irradiated toward the recording medium is not blocked, the laser beam can be effectively irradiated on the recording medium. The magnetic material for the core may be, for example, transparent ferrite. In the magnetooptical head unit of the invention, at least a part of the optical element should be made of a laser-beam-permeable magnetic material. By employing this construction, it is possible to reduce the number of parts for use in constructing the magnetooptical head unit, and hence miniaturize the magnetooptical head unit. In addition, the laser-beam-permeable magnetic material can be disposed only near the central portion of the optical element perpendicular to the laser-beam-exiting surface of the optical element, thereby increasing the precision with which the external magnetic field is positioned.

Further scope of applicability of the present invention will become apparent from the detailed description given hereinafter. However, it should be understood that the detailed description and specific examples, while indication preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 22 is a diagram of the construction of another embodiment of the magnetooptical head unit.

DESCRIPTION OF THE PREFERRED EMBODIMENTS

Embodiments and modes of a recording and reproducing apparatus of the invention will be described with reference to the accompanying drawings.

First Embodiment

Figure 1:
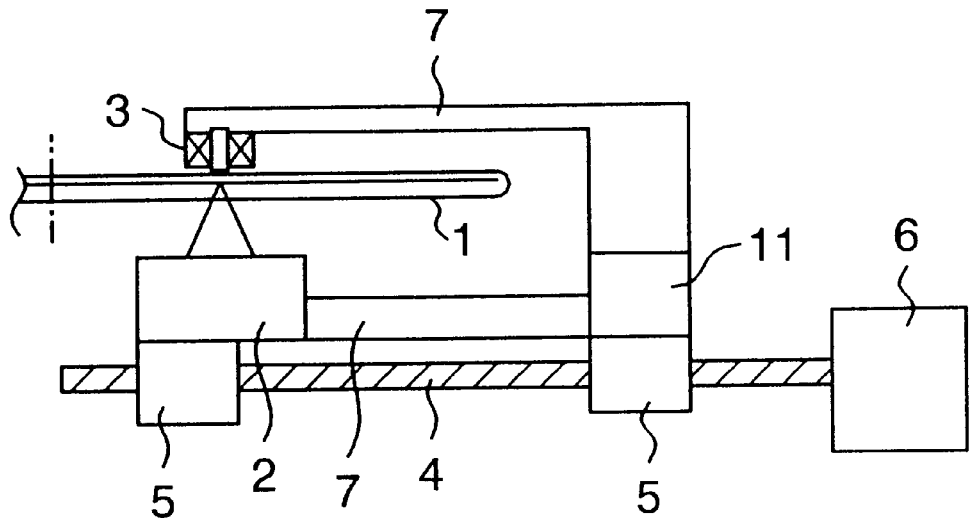
FIG. 1 is a cross-sectional view of the head structure of a conventional magnetooptical recording and reproducing apparatus.
Figure 2:
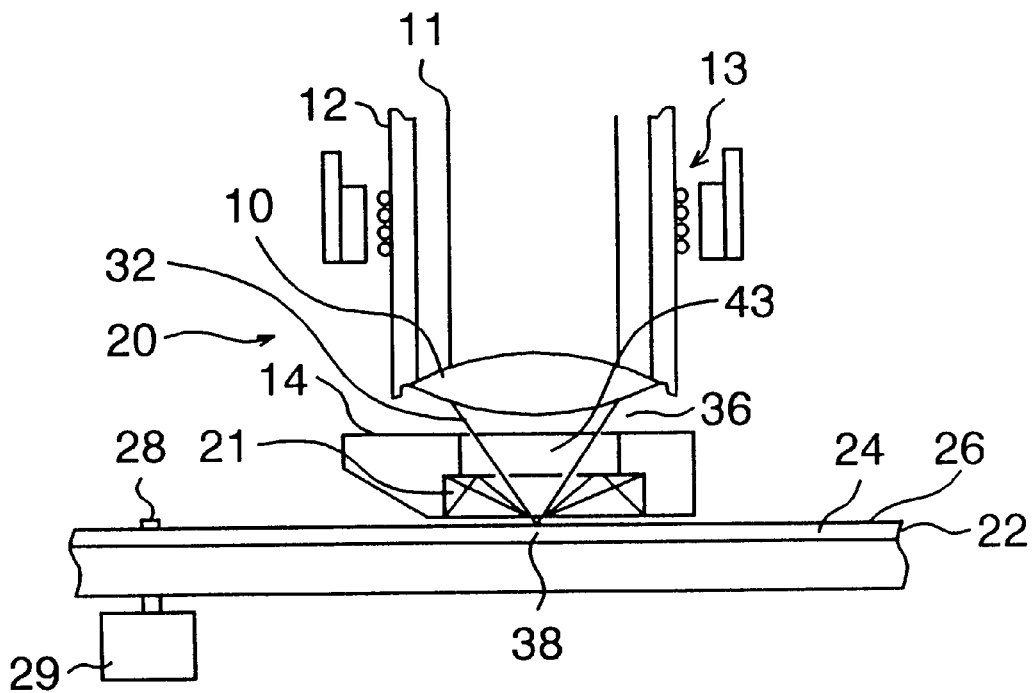
FIG. 2 is a cross-sectional view of the head structure of another conventional magnetooptical recording and reproducing apparatus.
Figure 3:
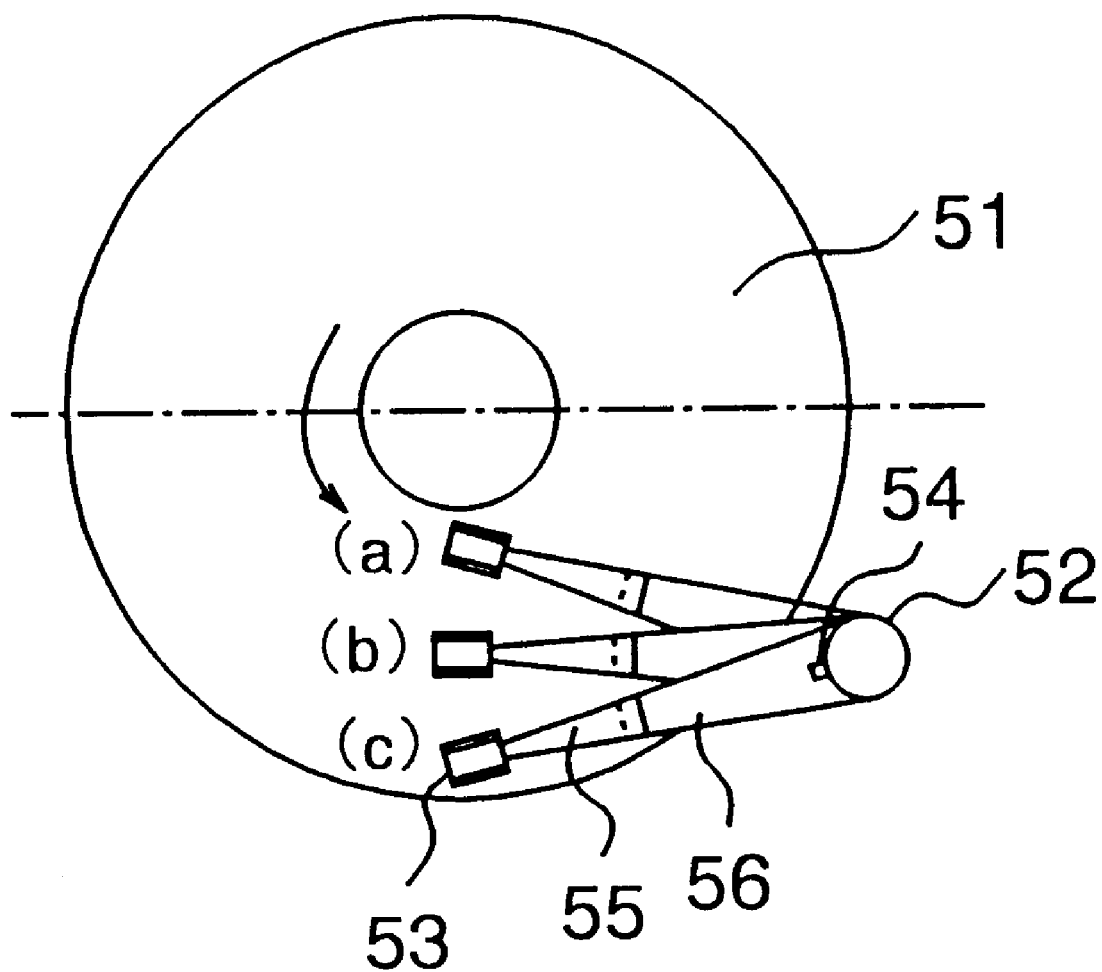
FIG. 3 is a plan view of a magnetooptical recording and reproducing apparatus of an embodiment of the invention.
Figure 4:
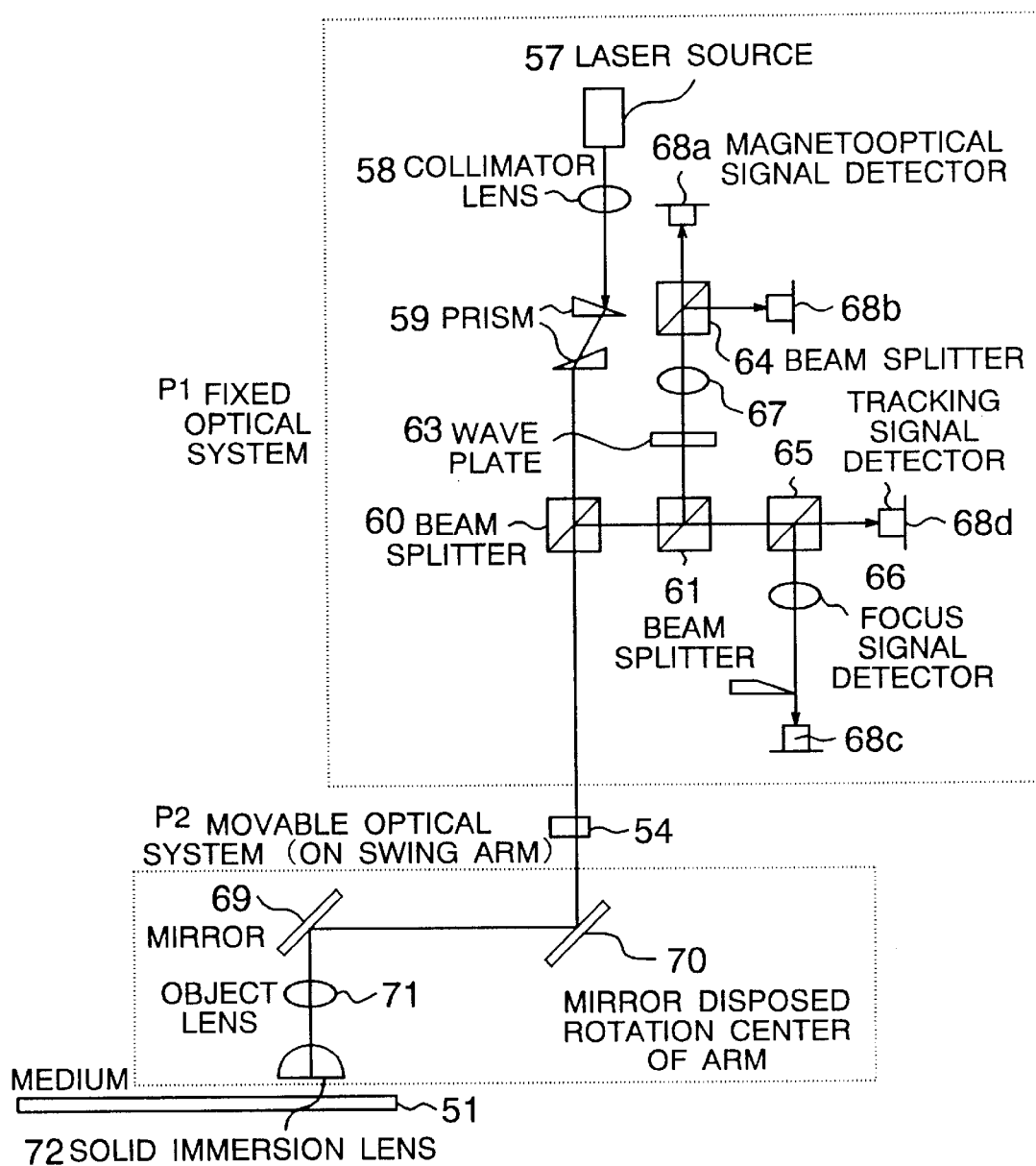
FIG. 4 is a diagram of the construction of the optical system employed in the embodiment shown in FIG. 3.

FIG. 3 shows the first embodiment of the head unit of an information recording and reproducing apparatus according to the invention, in which a floating-type magnetooptical head unit 53 is secured through a suspension 55 to the tip of a swing arm 56. The swing arm 56 has its fulcrum 52 provided adjacent the outer periphery of a disk recording medium 51. Thus, the swing arm 56 is moved in the radius direction of the disk recording medium 51 as at (a), (b) and (c) around the fulcrum, making the information processing access to all of the recorded regions. The suspension 55 serves to maintain the magnetooptical head unit 53 stably at a constant position in response to the floating function of the slider mounted on the magnetooptical head unit 53. The light source for the laser beam which is used for recording and reproducing an information signal is fixed to the recording and reproducing apparatus. The laser beam from the source is passed through a beam splitter 60 (see FIG. 4) provided near the pivot 52 of the swing arm 56, and through a laser beam window 54 which is provided on a light path connecting a fixed optical system P1 and a movable optical system P2, to the magnetooptical head unit 53. FIG. 4 shows the optical systems through which the laser beam is passed to the magnetooptical head unit 53. The optical system P1 is fixed to the recording and reproducing apparatus. On the contrary, a mirror 69, an object lens 71 and a solid immersion lens 72 of the movable optical system P2 are provided on the swing arm 56. A mirror 70 is provided at the pivot of the swing arm 56. The magnetooptical disk 51 has its recorded region tracks and track pit signal formed to be arranged in a wobble shape by a sample servo system. The magnetooptical disk 51 having tracks of wobble pit signal formed in a wobble shape was loaded on the spindle of the rotating drive shaft of the magnetooptical recording and reproducing apparatus.

The fixed optical system P1 has a light emitting portion and a light detecting portion. The light emitted from a laser source 57 is converted into a parallel beam by a collimator lens 58, and the intensity profile of the parallel beam is shaped by a prism 59. The shaped beam is passed through the beam splitter 60 to the movable optical system P2. The light reflected from the magnetooptical disk 51 back to the fixed optical system P2 is divided by the beam splitter 60 and other beam splitters 61 and 65 into beam portions for optical systems on the detection sides, or which are respectively conducted to a focused signal detector 68c, a tracking signal detector 68d, and magnetooptical signal detectors 68a, 68b.

The optical head unit of this embodiment can be used not only for the magnetooptical disk, but also for general optical disks such as a playback-exclusive optical disk, phase change optical disk and write once optical disk, and for recording and reproducing apparatus for magnetic recording media which perform optical beam tracking. Particularly for recording the magnetooptical disk, a light beam is irradiated on the recording film of the recording medium 51, and also a magnetic field is applied thereto by, for example, a conventional magnetic head. In this embodiment, the magnetic head (not shown) is provided on the side opposite to the side on which the optical head is placed. Thus, recording and reproduction were made by a magnetooptical modulating system.

Figure 5:
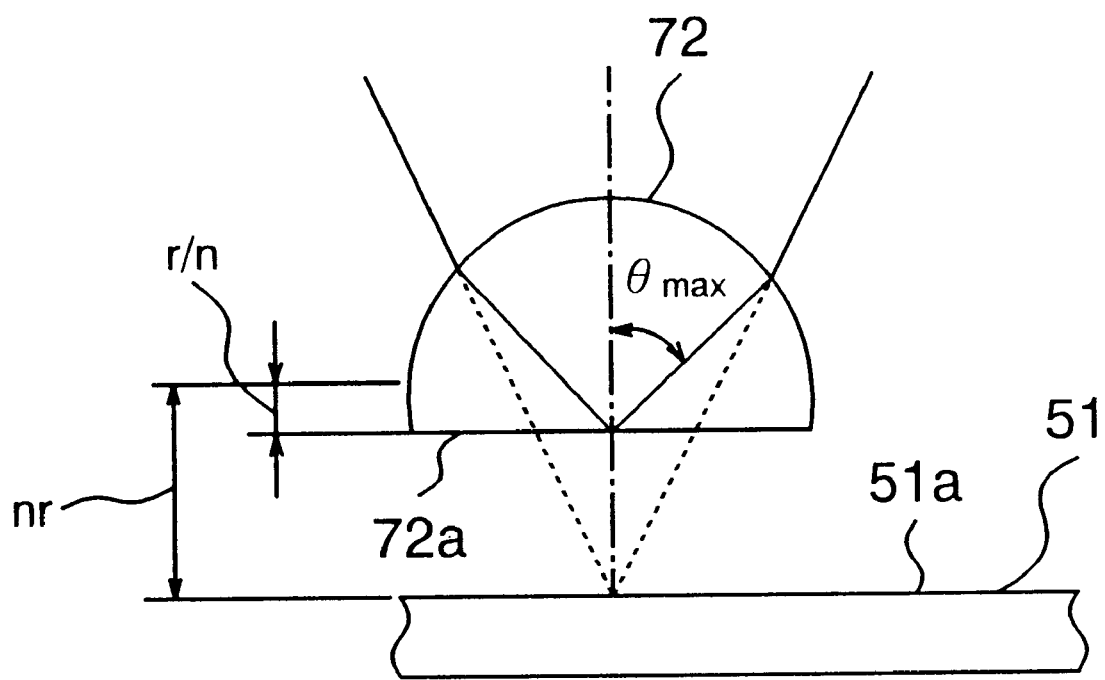
FIG. 5 is a diagram to which reference is made in explaining the principle under which an optical element forms an image, which element is used in the magnetooptical head unit utilized in the embodiment of FIG. 3.

The magnetooptical head unit mounted on the swing arm utilizes a solid immersion lens as an optical element for focusing the recording light on the recording medium. The optical element is made of a material of which the refractive index is larger than 1. FIG. 5 shows an example of the immersion lens 72 as such an optical element, or illustrates the idea useful for explaining the principle under which an image is formed by the optical element 72. A description will be made of the condition at which the laser beam to be irradiated on the recording medium 51 is focused to produce a smaller-diameter laser spot on the medium, thereby increasing the recording density. Generally, the spot diameter S can be defined by the following equation (1).

$$S=\lambda/(2NA)=\lambda/(2n\cdot\sin\theta_{max}) \quad (1)$$

where $\lambda$ is the wavelength of the laser light incident to the optical element 72, NA is the numerical aperture of the optical element 72, n is the refractive index of the optical element 72, and $\theta$ max is the angle (incident angle) between the optical axis and the outermost light wave of the incident light flux. From Eq. (1), it will be understood that when the wavelength $\lambda$ of the laser light is constant, increasing NA will decrease the spot diameter S. Because NA is defined as NA=n sine $\theta$ max, the value of NA can be increased by increasing the refractive index n and angle $\theta$ max. Thus, if the optical element 72 is made of a high-refractive index material, the wavelength of the incident light is decreased in the inside of the optical element 72. In addition, if the incident light is refracted at the surface of the optical element 72, and focused within the optical element 72, the angle $\theta$ max between the optical axis and the incident light can be further increased within the optical element 72 than before the light is incident to the optical element 72.

The optical element 72 is a hemispherical lens produced by cutting off part of a radius-r sphere. The section of the optical element 72, or the exiting surface, 72a of the optical element 72 is perpendicular to the optical axis of the incident light. The cut-off section 72a of the optical element 72 is located r/n from the center of the sphere. When the magnetooptical head unit with the optical element 72 mounted thereon is floated, the light-exiting surface 72a of the optical element 72 becomes parallel to the surface, 51a of the recording medium 51. When the incident light indicated by the solid line in FIG. 5 is refracted on the section of the spherical lens of the optical element 72, and focused toward a point on the light-exiting surface 72a, the optical element 72 projects the light through the evanescent space (air gap) on the recording medium 51 to form a laser spot on the medium placed on the light-emitting side 72a of the optical element 72. Therefore, the distance between the optical element 72 and the recording medium 51 is required to be within the attenuation distance of the evanescent light. The optical element 72 projects the incident light that passes through the optical element 72 indicated by the solid line, to form an image at the position (on the surface 51a of the recording medium 51) at which the broken lines which are the extension of the incident light are intersected. The optical element 72, as described above, is able to increase the value of NA up to the second-power-of-n times by decreasing the wavelength $\lambda$ of the incident light within the optical element 72, and by increasing the angle $\theta$ max due to the refraction on the sphere of the optical element 72. In other words, the spot diameter of the laser beam can be theoretically decreased to an extent of $1/n^2$. Thus, the optical element 72 is able to further reduce the spot formed on the recording medium 51 than the minimum spot obtained in a vacuum.

Moreover, even when the optical sphere is cut off at its center to form a hemisphere as the optical element 72, the spot diameter of the laser beam can be reduced to 1/n of that in the prior art, and hence smaller pits can be recorded.

Second Embodiment

Of the optical system mentioned with reference to FIG. 4 for the first embodiment, the magnetooptical head unit 53 includes an object lens drive, a head floating slider having an aperture through which the laser beam is passed along the center line of the object lens, and a thin-film magnetic coil with a ring coil. The magnetooptical head unit, which is constructed so that the center of the laser-beam passing aperture of the head floating slider is located on the extension of the center line of the object lens, is secured on the swing arm 56, and used as a swing arm magnetooptical head unit. The other arrangements are the same as in the first embodiment.

Figure 6:
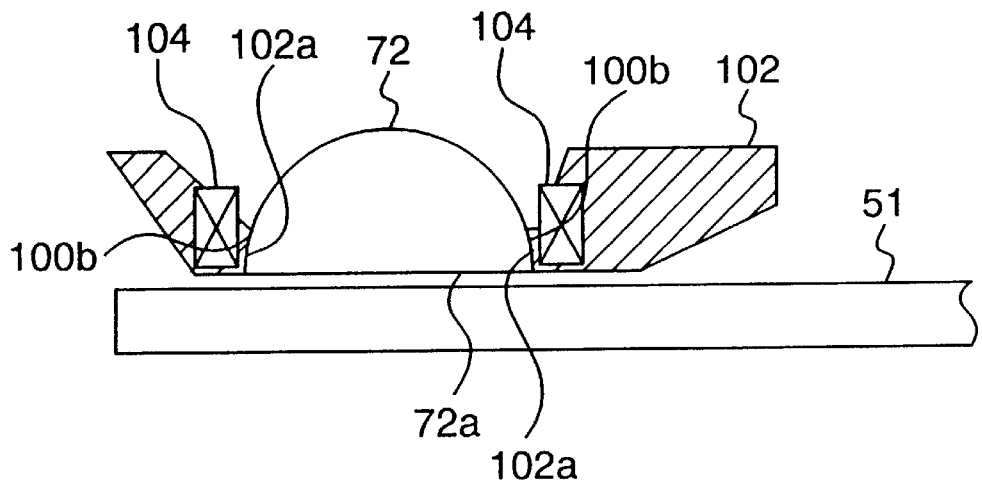
FIG. 6 is a cross-sectional view of the magnetooptical head unit having a magnetic coil and a solid immersion lens provided on the slider, which immersion lens is used as the optical element shown in FIG. 5.

FIG. 6 shows the floating-type magnetooptical head unit for use in this embodiment, or is a cross-sectional diagram of the magnetooptical head unit cut in the longitudinal direction of the slider 102. The magnetooptical head unit has the solid immersion lens 72 as the optical element and a magnetic coil 104 for applying an external magnetic field on the slider 102. The slider 102 has formed therein an aperture 102a with substantially the same diameter as the outer periphery of the solid immersion lens 72. The solid immersion lens 72 is engaged in the aperture 102a as shown in FIG. 6. The light-exiting surface 72a of the solid immersion lens 72 is made flush with the bottom of the slider. The magnetic coil 104 is embedded in the upper portion of the aperture 102a of the slider 102 to surround the outer periphery, 100b of the solid immersion lens 72. The slider 102 is connected to an actuator (not shown) of the magnetooptical recording and reproducing apparatus body through a plate spring supporting mechanism not shown. When the slider 102 is floated, the light-exiting surface 72a of the solid immersion lens 72 is made parallel to the magnetooptical recording medium 51, and close to the magnetooptical recording medium 51 up to a position within the attenuation distance of the evanescent light by the plate spring supporting mechanism. Under this structure, the recording laser beam irradiated from above is passed through the solid immersion lens 72, and focused on the magnetooptical recording medium 51 to form on the medium 51 a laser spot that is smaller than the theoretically minimum spot diameter in the air. This small laser spot can be formed by using the solid immersion lens 72 made of a material of which the refractive index n is larger than that of air and focusing the laser beam within the solid immersion lens 72 under the same principle as in the lens immersed in a liquid. When information is recorded, the laser beam is irradiated on the magnetooptical recording medium 51, and a magnetic field is also applied thereto from the magnetic coil 104, according to the laser irradiation timing and magnetic field applying timing.

Third Embodiment

In the optical system described with reference to FIG. 4 for the first embodiment, the solid immersion lens 72 within the movable optical system of the magnetooptical head unit 53 mounted on the swing arm 56 has formed on the magnetooptical disk 51 side of the lens 72 a coating of a film layer made of at least a single compound that is selected from such compounds as TiN (titanium nitride), SiN (silicon nitride), and $SiO_2$ (silicon oxide) or a combination of film layers made of a plurality of different compounds selected from those compounds. In addition to the coating of layers of the above compounds, a very hard crystalline carbon film layer such as amorphous carbon or DLC (diamond like carbon) was formed as a coating on the side by sputtering.

Fourth Embodiment

Figure 7A:
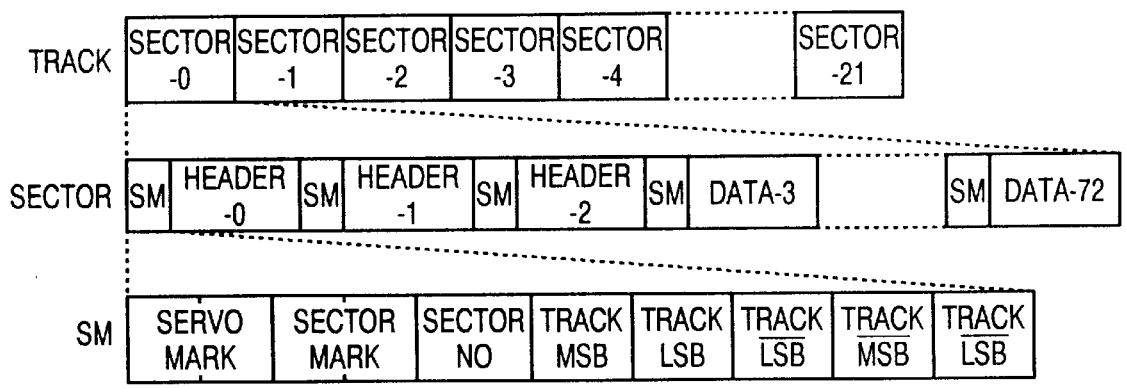
FIGS. 7A and 7B are diagrams of examples of the structure of a magnetooptical prepit pattern in this embodiment.
Figure 7B:
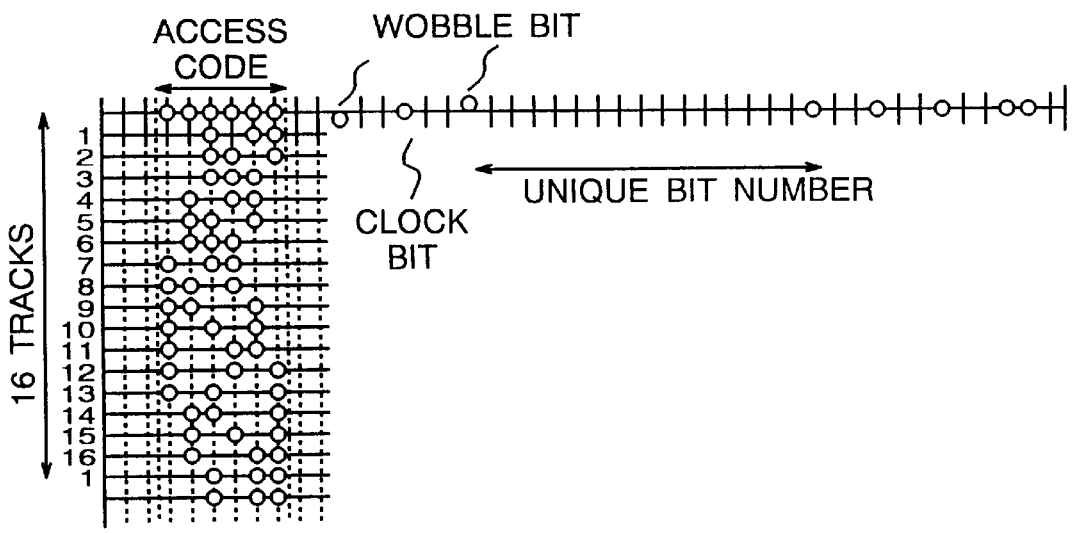

The formats shown in FIGS. 7A and 7B are employed for the prepit signal which is formed in the recording layer of the magnetooptical disk 51 according to the first embodiment. In other words, a sample servo system is employed, so that a track pit signal 6, wobble pits 11, clock pits 3 and servo signal access marks 16Tr are formed as in FIGS. 7A and 7B.

As shown in the sections of the first and second embodiments, when the optical read head unit is moved together with the swing arm, the angle of the optical head unit to the tracks on the inner periphery side of the recording medium 51 is different from that on the outer periphery side, and therefore preferably the sample servo system should be employed.

Fifth Embodiment

Figure 8:
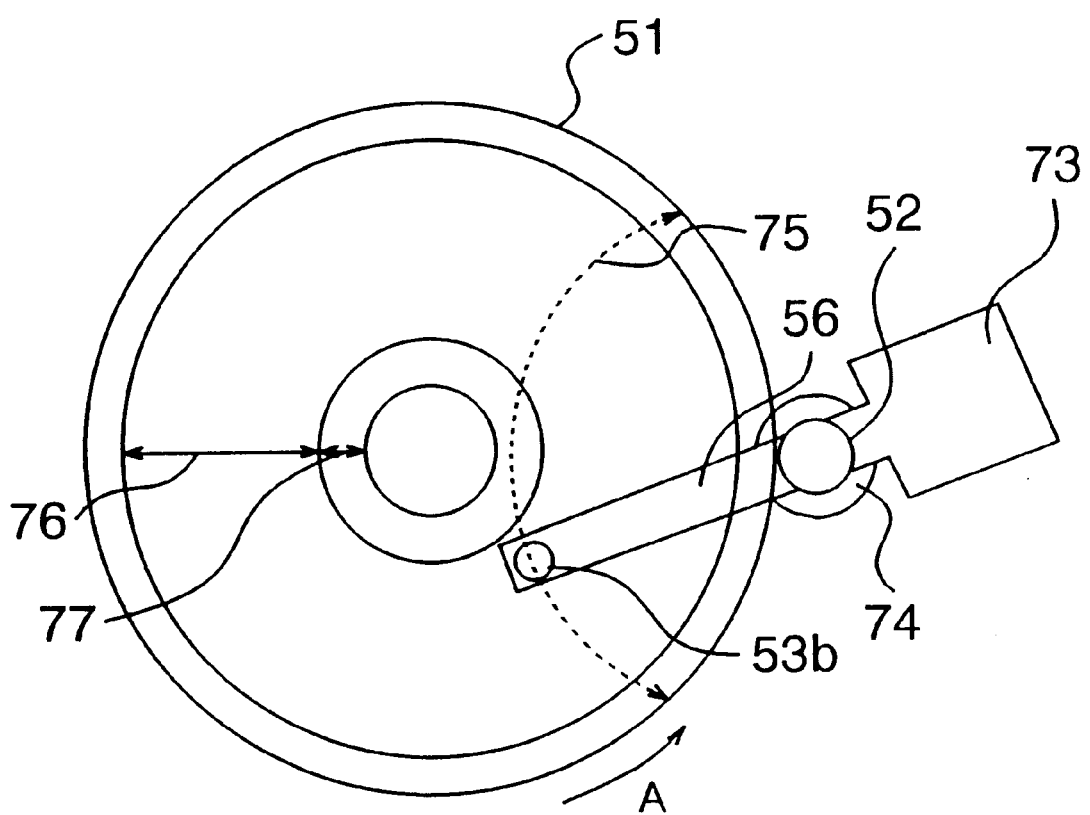
FIG. 8 is a plan view of another embodiment of the magnetooptical recording and reproducing apparatus.
Figure 9:
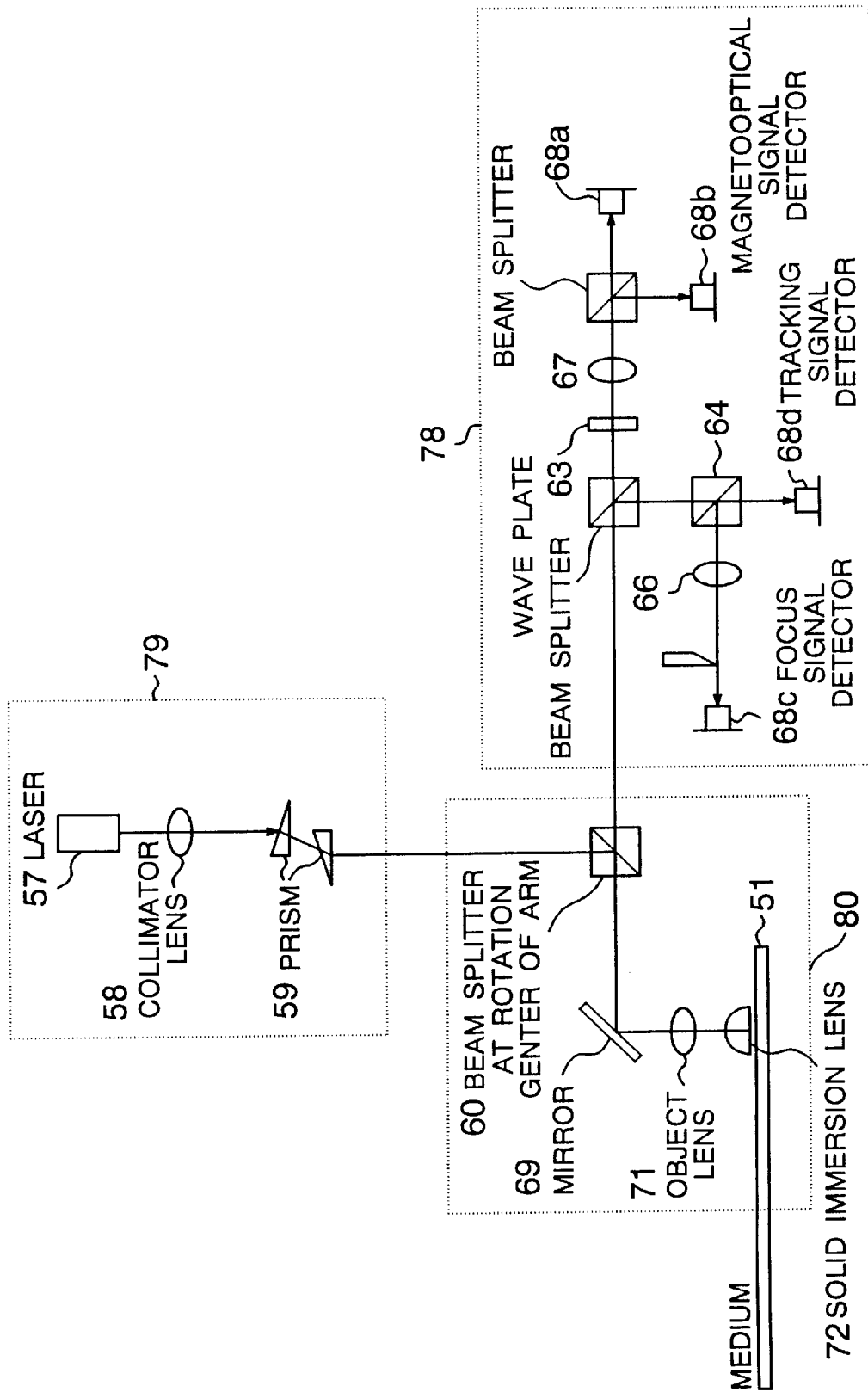
FIG. 9 is a diagram of the construction of the optical system in the embodiment of FIG. 8.

FIG. 8 shows a recording and reproducing drive for the disk recording medium. This drive has a swing arm magnetooptical head unit having a structure in which the swing arm has all of the detection optical systems of the optical head unit and fixed optical systems concerned with the laser beam from the magnetooptical head unit mounted thereon. FIG. 9 is a block diagram of all of the optical systems. In this embodiment, the fixed optical system P1 (see FIG. 4) is separated into a first optical system 79, and a second optical system 78. The first optical system 79 includes a laser source 57, a collimator lens 58, and a prism 59, and is fixed to the recording and reproducing drive. The second optical system 78 includes the signal detectors 68a, 68b, 68c and 68d. There is also a third optical system 80 which includes the beam splitter 60, a mirror 69, the object lens 71 and the solid immersion lens 72. The second and third optical systems 78, 80 are mounted on the arm of the swing arm magnetooptical head unit. FIG. 8 shows a plan view of the swing arm magnetooptical head unit as viewed from above. The magnetooptical head 53b on the swing arm is moved on the recording surface of the magnetooptical recording disk 51 along a locus 75, making access to information to record, reproduce or erase. This swing arm is a continuous body of the arm 56 and an arm 73 on both sides of the pivot 52. The beam from the laser source is passed to the magnetooptical head unit 53 through a light path chamber 74 constructed by the beam splitter 60 mounted on the pivot 52. The beam is reflected from the magnetooptical recording disk 51 after the access is received by the detectors of the second optical system fixed on the arm 73. The weight of the arm 73 of the swing arm including the second optical system 78 is balanced with respect to the pivot 52, or the center against the weight of the arm 56 including the third optical system 80 that is not included in the first and second optical systems.

Sixth Embodiment

In the optical systems mentioned with reference to FIG. 8 for the fifth embodiment, the constituent elements arranged on the magnetooptical head 53b include an object lens drive, a head floating slider having the solid immersion lens 72 which receives the laser beam passing along the center line of the object lens, and a magnetic head unit using a thin film magnetic coil with a ring coil. The floating slider has the solid immersion lens 72 with its center line coinciding with the extension of the center line of the object lens. The magnetooptical head unit is fixed on the swing arm 56, and used as a swing arm magnetooptical head unit. The other constructions are the same as in the fifth embodiment.

In the sixth embodiment, the magnetic head unit (not shown) is provided on the side of the recording medium opposite to the side on which the optical head unit is placed as in the first embodiment. Thus, recording and reproduction were made by the magnetooptical modulating system.

Seventh Embodiment

Figure 10:
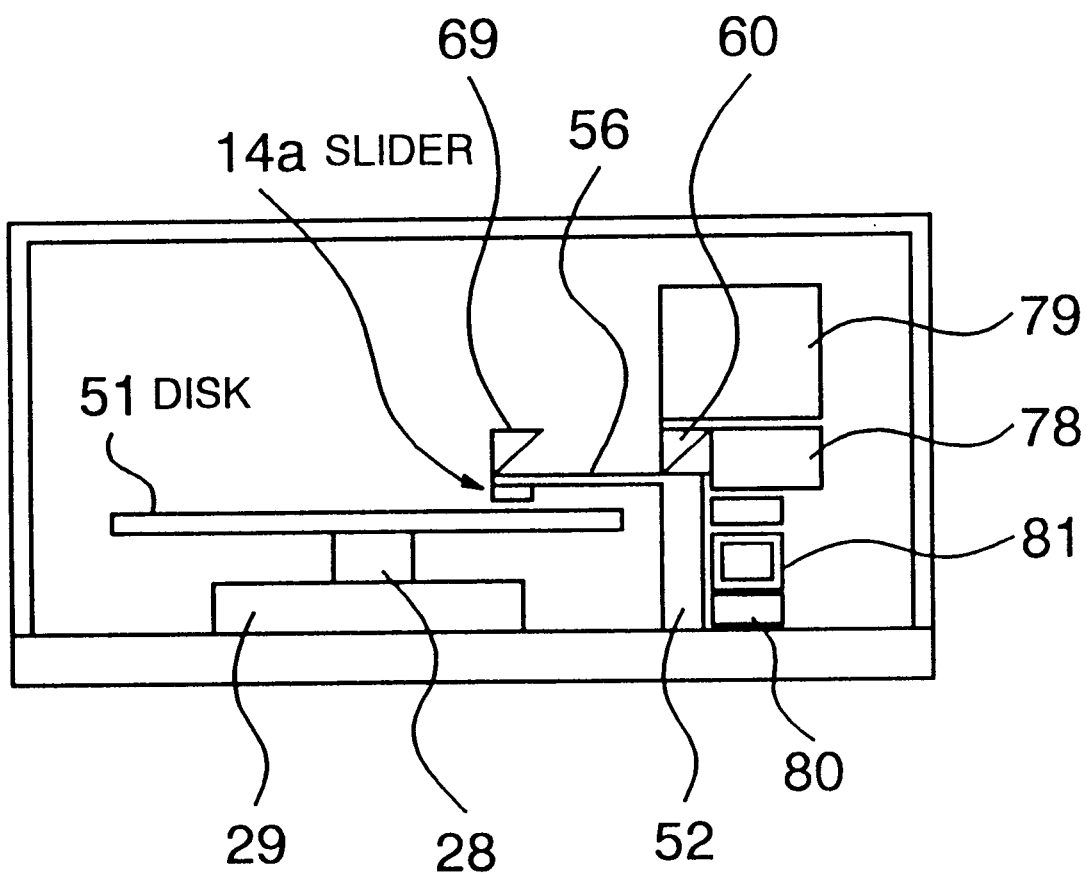
FIG. 10 is a side view of the embodiment of the magnetooptical recording and reproducing apparatus.
Figure 11:
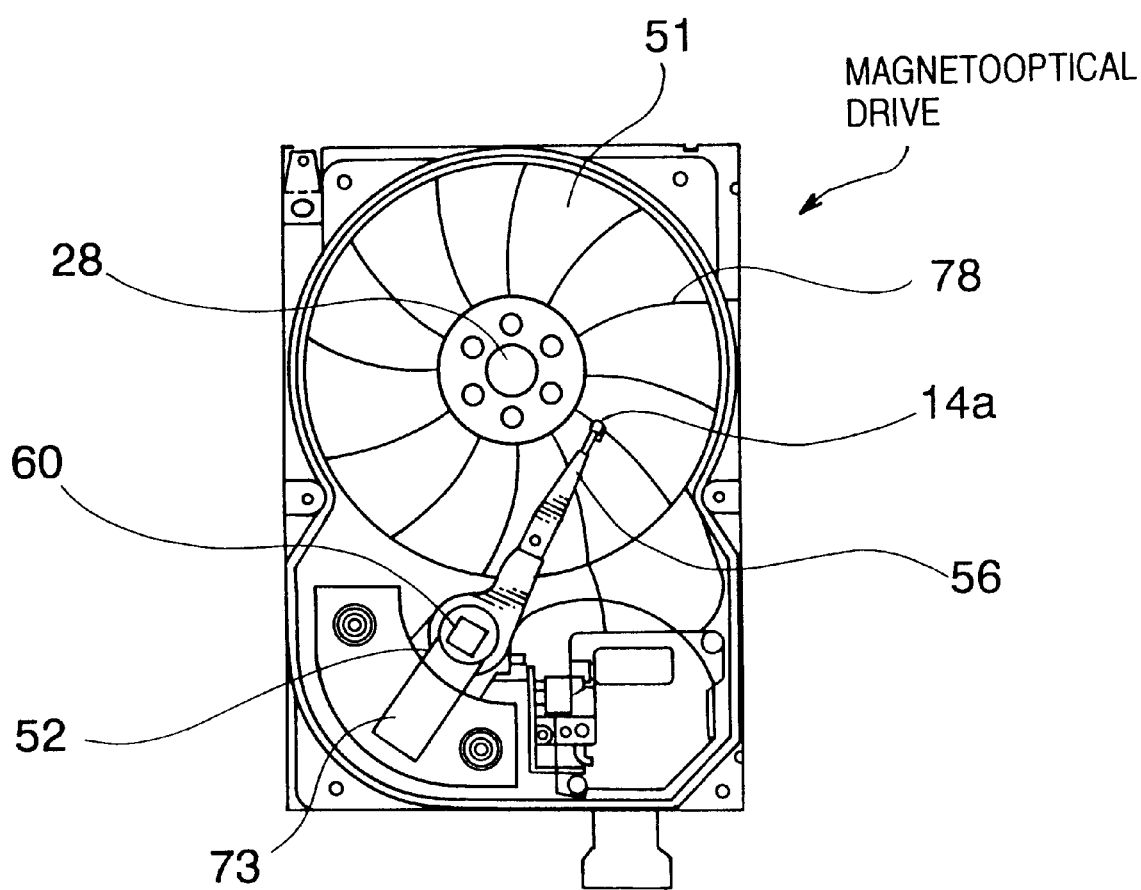
FIG. 11 is a plan view of the embodiment of FIG. 10.

FIGS. 10 and 11 show the seventh embodiment in which an optical system is provided on the side of the arm 56 opposite to the side on which the magnetooptical disk is placed, of the swing arm in the fifth embodiment.

FIG. 10 is a front view of the construction of the seventh embodiment, and FIG. 11 is a plan view of the top portion of this construction. Here, the swing arm 56, the second and third optical systems 78, 80 and a coil 81 are movable around the arm pivot 52. A magnet 80 and the first optical system 79 are fixed to the drive base.

The arm 73 of the swing arm has the first optical system 79 including the laser source and the second optical system 78 including the detectors for detecting the signal from the recording medium as shown in FIG. 9, both systems being fixed to the arm. The arm 56 of the swing arm has the magnetooptical head 53b fixedly provided. In addition, the magnet 80 and the coil 81 are provided on the arm 73 of the swing arm in order to control the direction of the laser beam transmitted from the first optical system 79 and received by the second optical system 78, and the rotation of the magnetooptical head 53b of the swing arm around the pivot 52. The laser beams transmitted and received by the magnetooptical head 53b are separated by the beam splitter 60 that is provided at the arm pivot 52. The other portions are the same as in the fifth embodiment.

Eighth Embodiment

The prepit signal recorded on the magnetooptical disk 51 used in the fifth embodiment is formed in the format of the prepit region 78 shown on the magnetooptical disk 51 in FIG. 11. The format pattern of the prepits is illustrated in FIGS. 7A and 7B, and is the same as in the fourth embodiment. The other portions of the magnetooptical recording and reproducing apparatus are the same as in the fifth embodiment.

Ninth Embodiment

Figure 12:
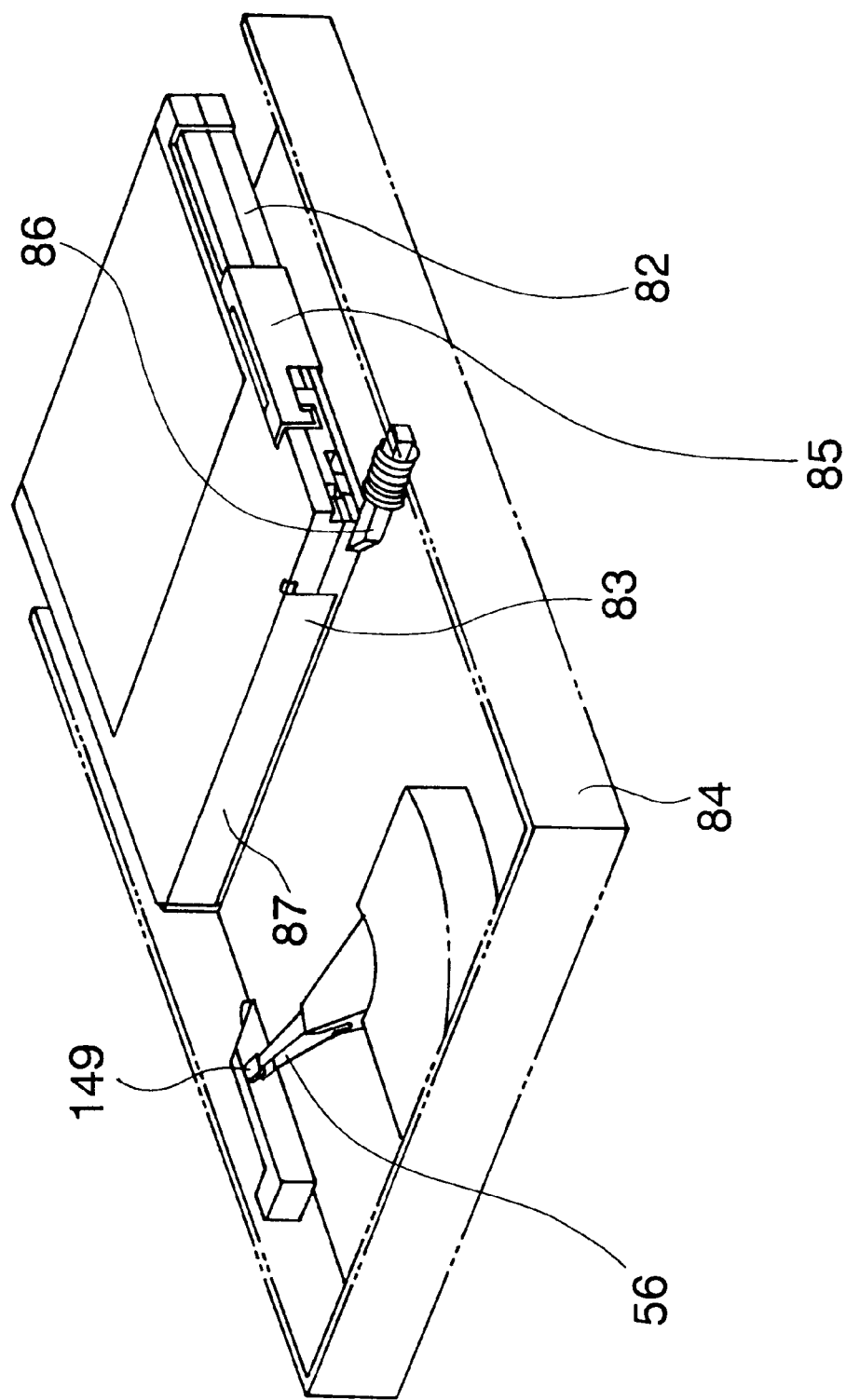
FIG. 12 is a perspective view of a magnetooptical disk cartridge of the embodiment.

FIG. 12 shows the ninth embodiment in which the magnetooptical disk 51 used in the fifth embodiment is placed in a disk cartridge and loaded. The magnetooptical disk 51 (not shown) is placed in the disk cartridge 82 in FIG. 12. When the disk cartridge 82 is not used, its magnetooptical head insertion mouth 87 is tightly closed by a shutter 83. When the disk cartridge is loaded and used in the recording and reproducing apparatus (not shown), a projection 86 provided within the apparatus drives a shutter slider 85 to open the shutter 83. The swing arm 56 is then driven to rotate, and the magnetooptical head unit at the tip of the swing arm 56 is moved in a fan-shaped manner on the surface of the magnetooptical disk 51 with the disk cartridge 82 is in parallel with the surface of the magnetooptical disk 51, making access to the tracks.

Tenth Embodiment

Figure 13:
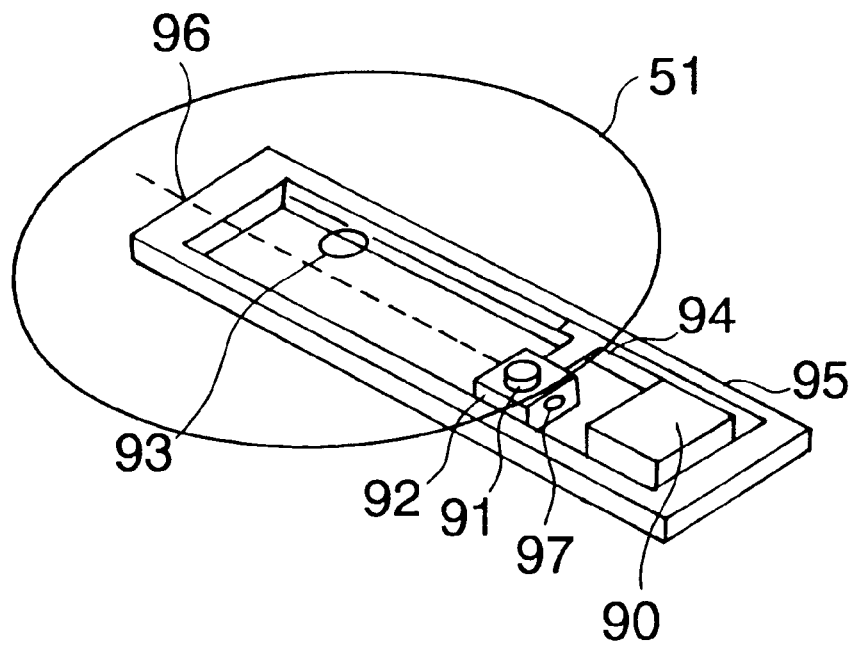
FIG. 13 is a diagram of the construction of another embodiment of the magnetooptical recording and reproducing apparatus.

FIG. 13 shows the tenth embodiment in which a magnetooptical head 91 of linear motor moving type is used. A magnetooptical head driving body 92 is slid on an arm 95 which is provided within the magnetooptical recording and reproducing apparatus and which has a linear motor-94 movement guide rail 93 provided to linearly move in a direction 96 parallel to the surface of the magnetooptical disk 51, so that the access to the medium is made by the head unit. The optical system is an integral combination of the fixed optical system P1 and movable optical system P2 shown in FIGS. 4 and 9 or another integral combination of the first optical system 79 and optical system 78. This optical system is secured to the fixed optical system 90 shown in FIG. 13. The transmission and reception of the laser beam between the fixed optical system 90 and the driving body 92 of the magnetooptical head 91 are made through a window 97 of the magnetooptical head 91.

Figure 14:
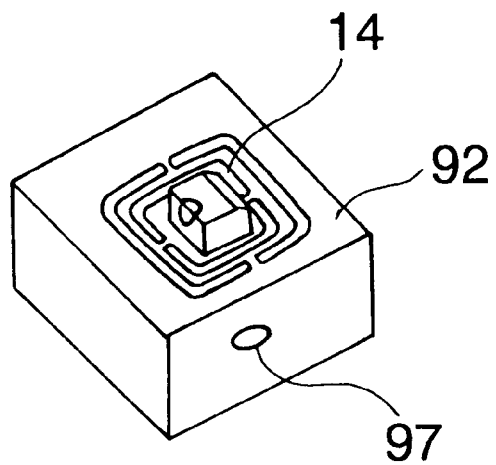
FIG. 14 is a partially magnified perspective view of the structure shown in FIG. 13.
Figure 15:
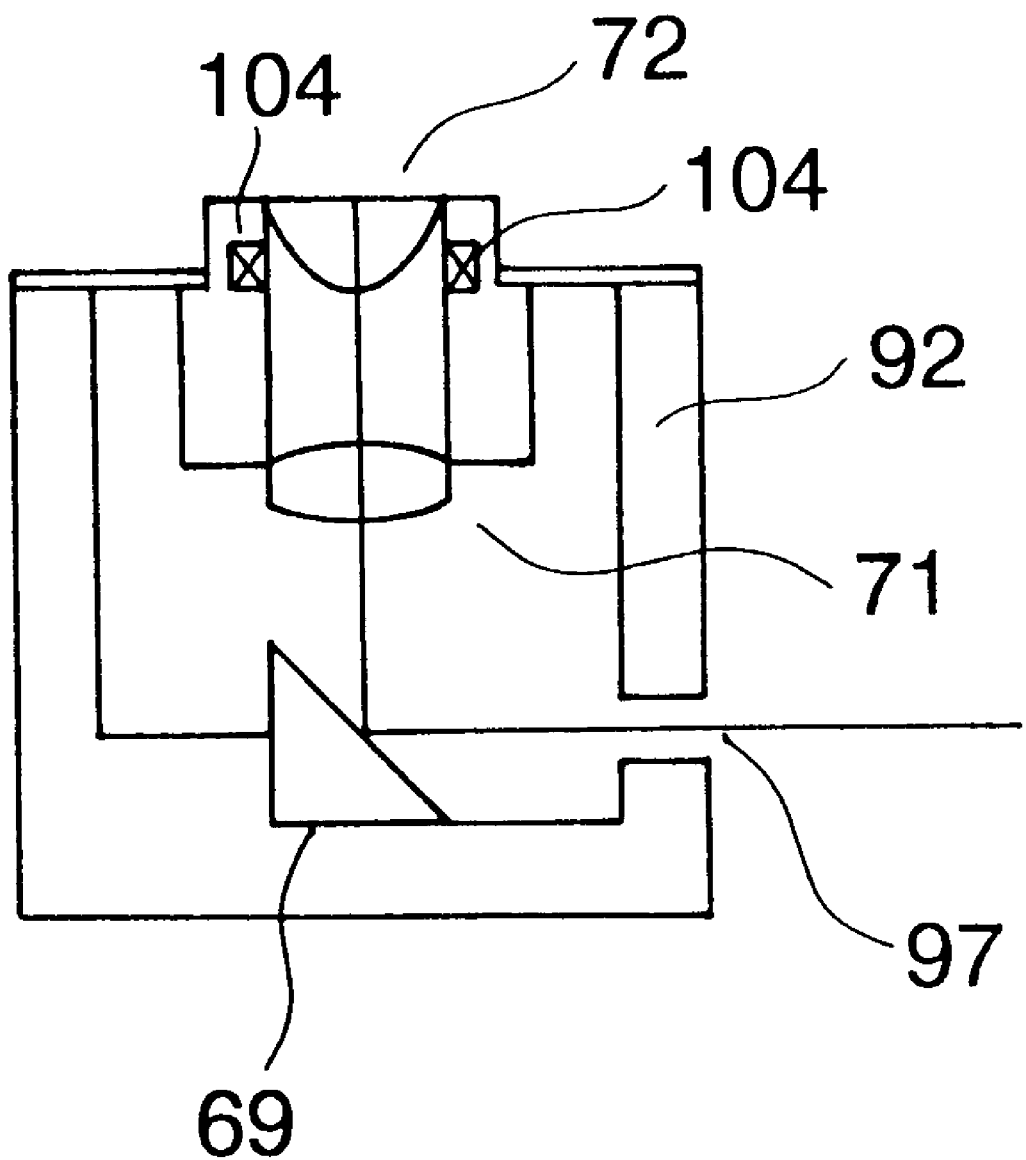
FIG. 15 is a cross-sectional view of the structure of FIG. 14.

FIG. 14 is a perspective view of the driving body 92, and FIG. 15 is a longitudinal cross-sectional view of the body.

Referring to FIGS. 14 and 15, the magnetooptical head 91 has fixedly provided therein an optical system portion including the mirror 69, the object lens 71, and the solid immersion lens 72, the head floating slider portion 14, and a magnetic head portion including the thin-film magnetic coil of a ring coil. The solid immersion lens 72, and the thin film magnetic coil with a ring coil are installed on the head floating slider 14.

Eleventh Embodiment

Figure 16:
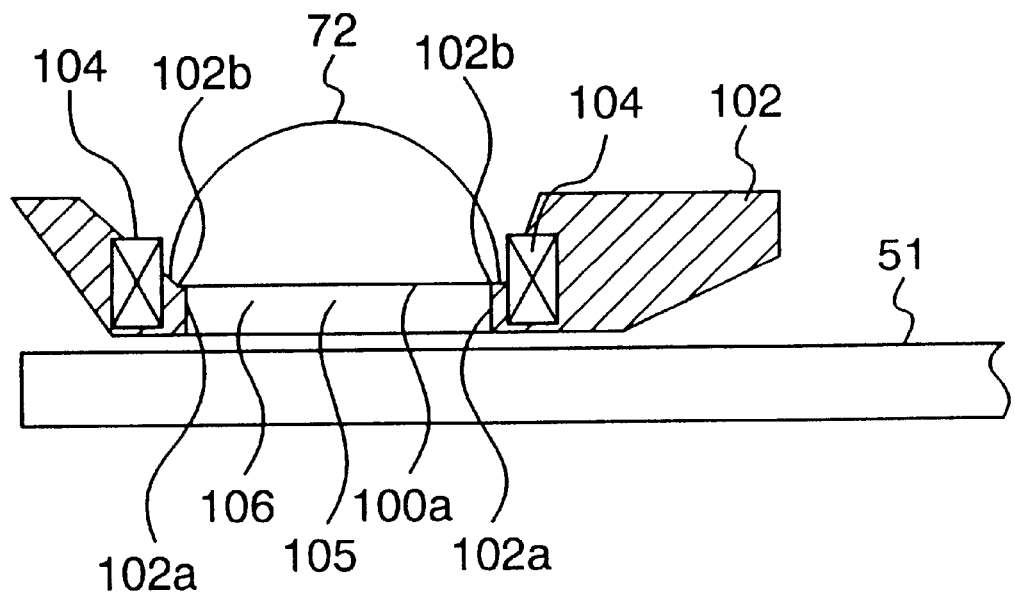
FIG. 16 is a cross-sectional diagram of an example of the magnetooptical head unit having the solid immersion lens mounted on the slider and the magnetic coil incorporated in the slider.

FIG. 16 shows the solid immersion lens 72 of the floating type magnetooptical head unit of FIG. 6 that is mounted on the slider 102. In order to mount the solid immersion lens 72 on the slider of FIG. 6, the portion, 105 of the slider 102 in which the solid immersion lens 72 is fitted is made of a laser-beam-permeable material, for example, glass. The solid immersion lens 72 is fixed to a lens mounting portion 102b outside the laser-beam-permeable material 106. The magnetic coil 104 is built in the slider 102 as in the first embodiment.

Twelfth Embodiment

Figure 17:
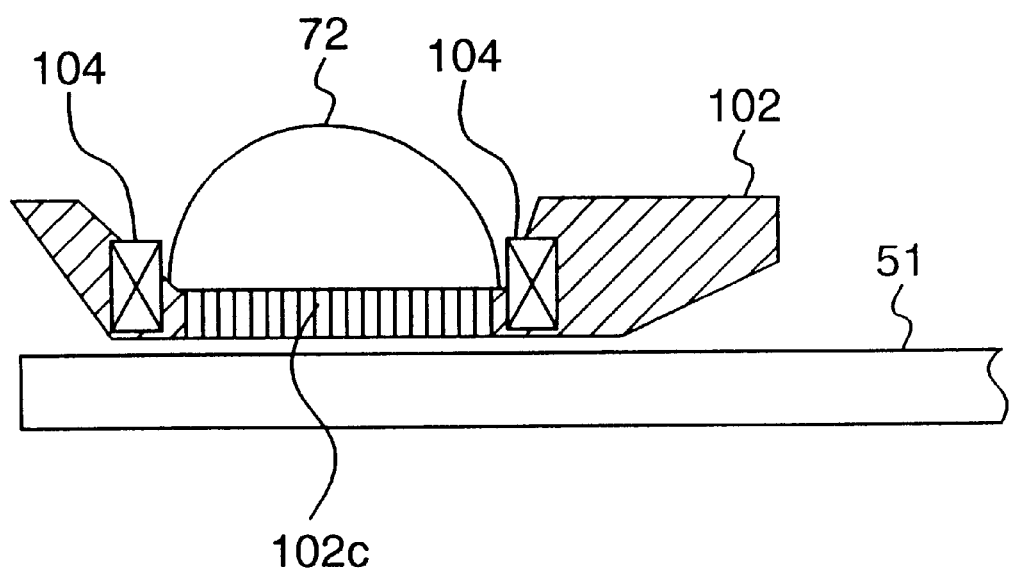
FIG. 17 is a diagram of an example of the magnetooptical head unit having a magnetic material, capable of allowing a laser beam to pass therethrough, at the position where the solid immersion lens is provided.

FIG. 17 shows the floating type magnetooptical head unit with a magnetic core 102c used in place of the laser-beam-permeable material 106. The magnetic core 102c preferably made of a material capable of allowing the laser beam to be penetrated therethrough, and having a small coercive force and a large saturated magnetic flux density, for example, preferably made of transparent ferrite, yttrium iron garnet or rare earth iron garnet. Since the magnetic core 102c is easily magnetized by the external magnetic field applied from the magnetic coil 104, the magnetic flux can be focused below the solid immersion lens 72, and thus easily controlled to be applied to the magnetooptical recording medium 51.

Thirteenth Embodiment

Figure 18:
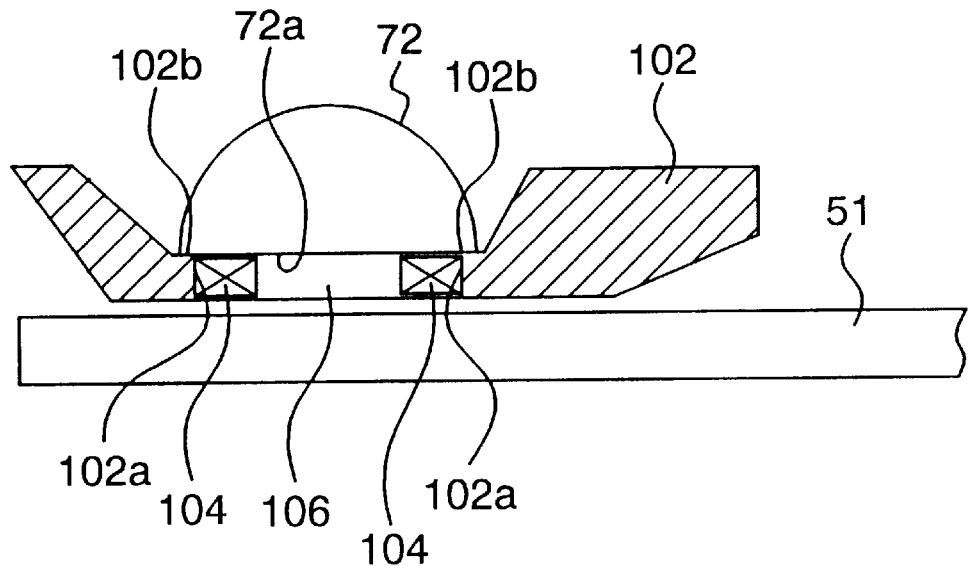
FIG. 18 is a cross-sectional view of an example of the magnetooptical head unit having the magnetic coil bonded to the light-exiting side of the solid immersion lens so as to face the magnetooptical recording medium.
Figure 19A:
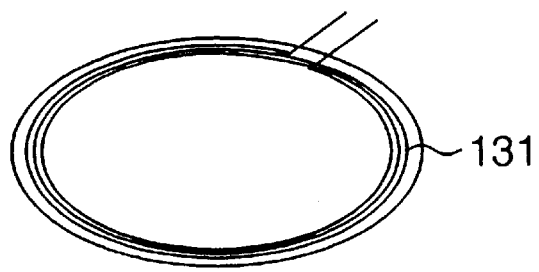
FIGS. 19A and 19B are external perspective views of a film-like magnetic coil used in the optical head unit.
Figure 19B:
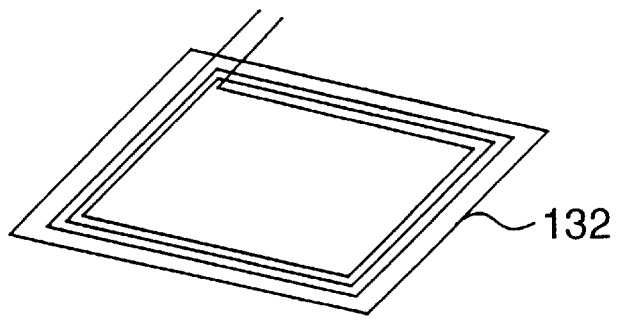

FIG. 18 shows a floating type magnetooptical head unit in which the magnetic coil 104 shown in FIG. 16 is incorporated below the solid immersion lens 72. The magnetic coil 104 is bonded to the light-exiting side 72a of the solid immersion lens 72. With this structure, the magnetic coil 104 is disposed to avoid shutting off the light flux exiting from the solid immersion lens 72. According to this embodiment, the magnetic coil 104 is located below the light-exiting surface 72a of the solid immersion lens 72 and close to the magnetooptical recording medium 51. Therefore, the magnetic coil is preferably made as thin as possible. For example, it should be a film-shaped magnetic coil 131 of a ring shape as shown in FIG. 19A or a film-shaped magnetic coil 132 of a rectangular ring shape as shown in FIG. 19B.

Fourteenth Embodiment

Figure 20:
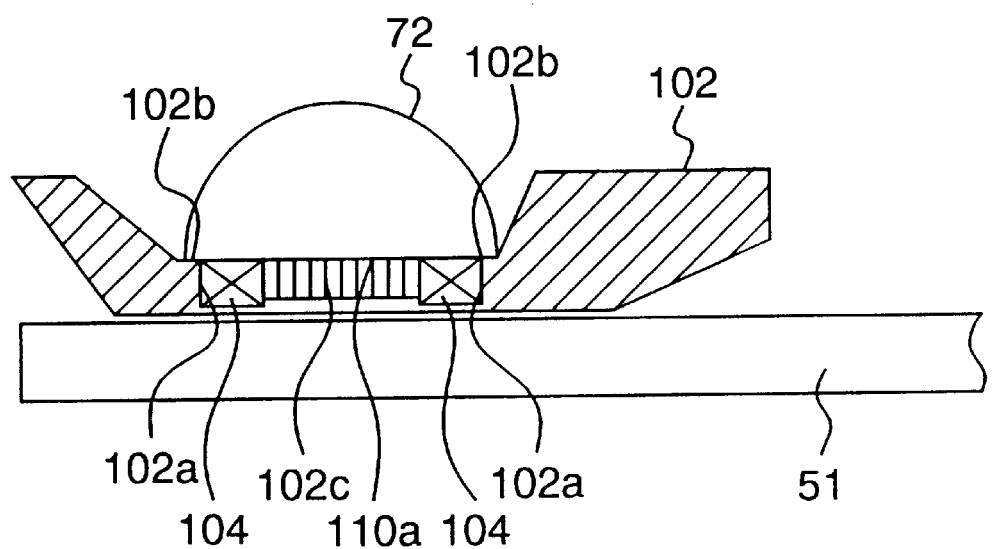
FIG. 20 is a cross-sectional view of an example of the magnetooptical head unit with its magnetic core provided to cause the laser beam to pass therethrough at the location where the solid immersion lens of the magnetooptical head unit shown in FIG. 18 is provided.

FIG. 20 shows the structure of a magnetooptical head unit with the magnetic core 102c provided in place of the laser-beam-permeable member 106 of the floating type magnetooptical head unit shown in FIG. 18. The floating type magnetooptical head unit of FIG. 21 has the magnetic core 102c provided between the solid immersion lens 72 and the magnetooptical medium 51 and inside the magnetic coil 104. The magnetic core 102c is made of the same material as the laser-beam-permeable magnetic material of FIG. 18. Thus, the floating type magnetooptical head unit of this embodiment makes it possible to form a smaller-diameter laser spot on the magnetooptical recording medium 130, and to stably and easily control the magnetic field being applied to the magnetooptical recording medium 51.

Fifteenth Embodiment

Figure 21:
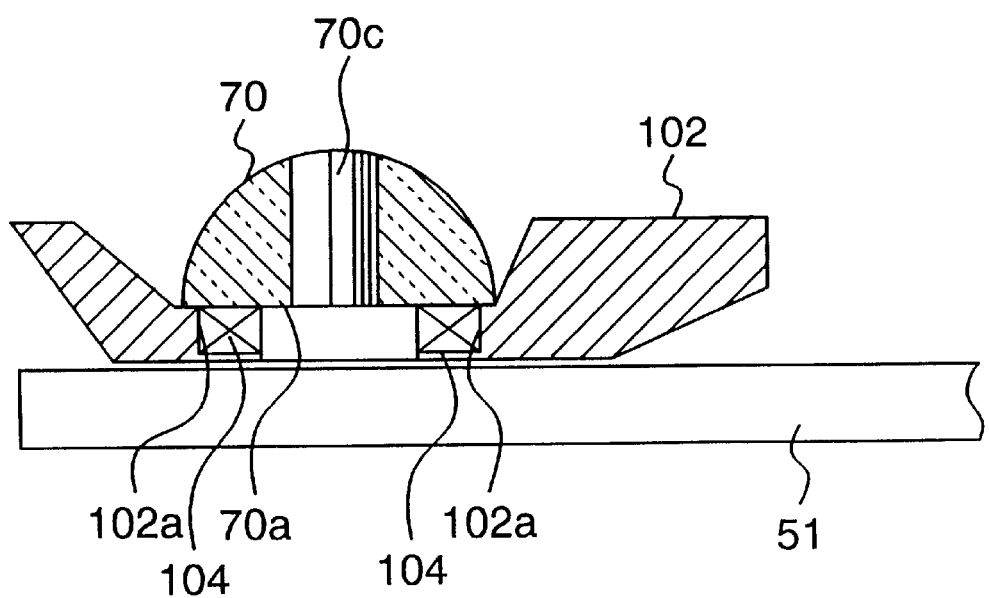
FIG. 21 is a cross-sectional view of an example of the magnetooptical head unit shown in FIGS. 19A, 19B, with a magnetic core provided to cause the laser beam to pass therethrough at around the center crossing, at right angles, the light-exiting side of the solid immersion lens.

FIG. 21 shows the construction of a floating type magnetooptical head unit in which at least part of the solid immersion lens 70 in the magnetooptical head unit shown in FIGS. 19A and 19B is made of a laser-beam-permeable magnetic material, for example, transparent ferrite. The solid immersion lens 70 has only a portion 70c made of a magnetic material, and the portion 70c is located near the center of the solid immersion lens 70 and perpendicular to the laser-beam-exiting surface 70a from which the laser beam exits. According to the structure of this embodiment, the magnetic core 102c used in the magnetooptical head unit shown in FIG. 17 or 20 can be eliminated from the structure. This solid immersion lens 72 makes it possible to decrease the distance between the magnetooptical recording medium 51 and the magnetic coil 104. Thus, the external magnetic field can be more precisely applied to the target, and the magnetooptical head unit can be simplified in its construction. This solid immersion lens 72 can be produced by first abrading and polishing a proper size of glass into a hemispherical shape in which a lens part with an opening is formed at its central region, and then a magnetic material is filled in the opening by sputtering or vacuum evaporation.

Sixteenth Embodiment

FIG. 22 shows the seventeenth embodiment of a magnetooptical recording and reproducing apparatus of which the magnetooptical head unit uses the solid immersion lens 70 with a floating type slider formed. FIG. 23 illustrates all of the magnetooptical recording disk 51 and magnetooptical head unit. The object lens 71 is mounted on an object lens drive not shown. The object lens drive, the solid immersion lens 70, the slider 102, the magnetic coil 104 and the mirror 69 are combined into a unit, or the magnetooptical head 53b. This magnetooptical head 53b is securely mounted on the tip of the swing arm of the magnetooptical recording and reproducing apparatus. The magnetooptical head unit in the seventeenth embodiment utilizes recesses 102s and 100s which are formed in certain regions of the sliding surfaces of the slider 102 and solid immersion lens 70, respectively. These recesses 102s and 100s have formed therein floating grooves for floating the magnetooptical head unit. The other portions of this magnetooptical recording and reproducing apparatus are the same as in the fifth embodiment and sixth embodiment.

Seventeenth Embodiment

Figure 23A:
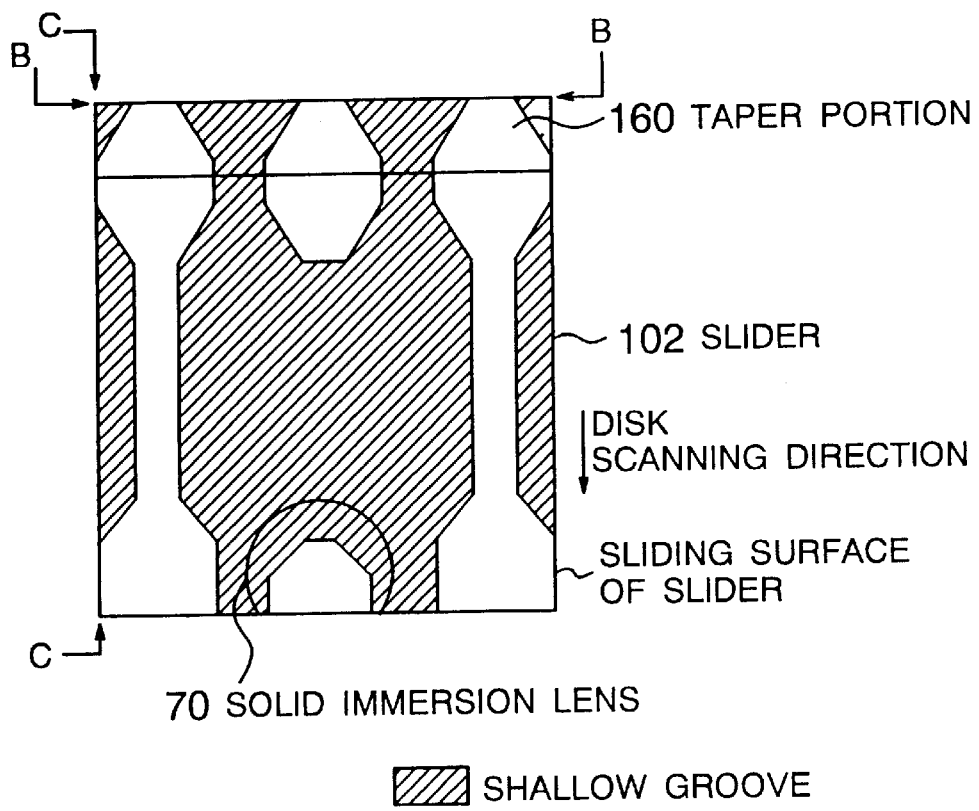
FIGS. 23A, 23B and 23C are a plan view and cross-sectional views of the construction of an example of the head slider.
Figure 23B:
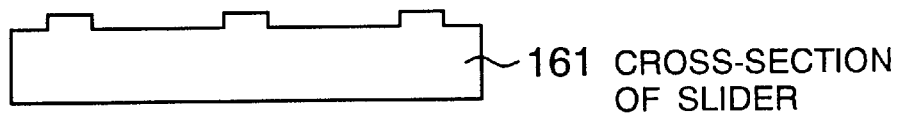
Figure 23C:

FIGS. 23A, 23B and 23C are a bottom view of the slider 102 showing the shapes of the floating grooves for floating the swing arm magnetooptical head unit mounted on the sliding surface of the slider 102 secured to the tip of the swing arm 56 of the magnetooptical recording and reproducing apparatus, a side view taken along a line B—B in FIG. 23A, and a side view taken along a line C—C in FIG. 23A, respectively. Here, the hatched areas of the bottom view of FIG. 23A indicate shallow grooves. In addition, the bottom side of the slider has the solid immersion lens 70 provided at the fore end in the disk traveling direction, and a taper portion 160 provided at the back end in order to attain a necessary floating characteristic. The other constructions of the magnetooptical recording and reproducing apparatus are the same as in the fifth and sixth embodiments, and thus will not be described in detail.

According to the above embodiments, since the magnetooptical recording and reproducing drive using the swing arm magnetooptical head unit makes it possible that the magnetooptical head unit moves, scans and accesses within a narrow, and thin space parallel to the magnetooptical disk surface, the magnetooptical recording and reproducing drive can be produced to be compact and thin. Therefore, even though the magnetooptical disk has been developed to have a smaller diameter, the magnetooptical recording and reproducing drive can be altered to be small-sized in accordance with the reduction of the disk diameter. In addition, since the swing arm magnetooptical head unit can make access by narrower fan-shaped movement, it can be controlled to accelerate by changing the swing angular velocity of the arm, thus further speeding up the access operation. Moreover, since the solid immersion lens is used in the magnetooptical head unit, the disk recording medium can be recorded at higher density with highly fine information pits, magnetic domains or signals of domains, and the high-density recorded signals on the disk recording medium can be precisely reproduced and erased. Also, since the film-shaped magnetic coil is used, the magnetooptical head unit has a light weight, and hence the weight of the swing arm is less. Thus, the total weight of the whole recording and reproducing drive can be reduced by use of the light-weight swing arm. Furthermore, since the head floating slider is used for the magnetooptical head unit, the head unit can avoid hitting the magnetooptical disk, thus preventing a crash.

The above embodiments can be applied not only to simply magnetooptical heads and magnetooptical recording disks, but also to other various different information recording media such as playback-exclusive disks, phase change disks and write once optical disks, general heads for use with those disks, and recording and reproducing apparatus for use with those disks and heads.

The invention being thus described, it will be obvious that the same may be varied in many ways. Such variations are not to be regarded as a departure from the spirit and scope of the invention, and all such modifications as would be obvious to one skilled in the art are intended to be included within the scope to the following claims.

We claim:

1. A recording and reproducing apparatus comprising:
    a swing arm, said swing arm having an arm portion and a swing driving pivot, said swing driving pivot being positioned to be adjacent an outer periphery of a recording medium when the recording medium is placed in the recording and reproducing apparatus;
    a head unit mounted on an end of said first portion of said swing arm, said head unit including at least a head slider provided with a lens and a laser permeable member mounted thereon; and
    signal detection devices mounted on said swing arm.

2. The recording and reproducing apparatus according to claim 1, wherein said swing arm includes a first, diskrecording-medium side end and a second, opposite end, and a fulcrum of said swing arm is located at said swing driving pivot between said first and second ends, and said signal detection devices are fixedly provided at said second end.

3. The recording and reproducing apparatus according to claim 1, wherein said head slider is provided with said lens and said laser-beam-permeable member and a magnetic coil.

4. The recording and reproducing apparatus according to claim 2, wherein said head slider is provided with said lens and said laser-beam-permeable member and a magnetic coil.

5. The recording and reproducing apparatus according to claim 1, wherein said head slider is at least provided with a solid immersion lens and said laser-beam-permeable member.

6. A recording and reproducing apparatus comprising a solid immersion lens, wherein a protective film is provided at a medium facing surface of said solid immersion lens.

7. The recording and reproducing apparatus according to claim 6, wherein said protective film is made of TiN (titanium nitride), SiN (silicon nitride), SiO2 (silicon oxide), amorphous carbon, DLC (diamond like carbon) or a very hard crystalline carbon film layer, or a combination of film layers made of a plurality of different compounds selected from the group consisting of TiN, SiN, SiO2, amorphous carbon, DLC or a very hard crystalline carbon film layer.

8. The recording and reproducing apparatus according to claim 6, wherein said solid immersion lens is provided on a head unit including a head slider formed with a laser-beam-permeable member, said head unit is disposed on a swing arm having an arm unit and signal detection devices for a disk recording medium mounted thereon, and a swing driving pivot of said swing arm is provided near the outer periphery of said disk recording medium disposed on said recording and reproducing apparatus.

9. The recording and reproducing apparatus according to claim 8, wherein said swing arm includes a first, disk-recording-medium side end and a second, opposite end, and a fulcrum of said swing arm is located at said swing driving pivot between said first and second ends, and said signal detection devices are fixedly provided at said second end.

10. The recording and reproducing apparatus according to claim 8, wherein said head unit is provided with a magnetic coil.

11. A recording and reproducing apparatus comprising a solid immersion lens, wherein a magnetic film is provided at a medium facing surface of said solid immersion lens.

12. The recording and reproducing apparatus according to claim 11, wherein said magnetic film is penetrable by a laser beam and is made of transparent ferrite, yttrium iron, garnet or a rare earth iron garnet, or a combination of film layers made of plurality of different compounds selected from the group consisting of transparent ferrite, yttrium, iron, garnet or a rare earth iron garnet.

13. The recording and reproducing apparatus according to claim 11, wherein said solid immersion lens is disposed on a head unit including a head slider formed with a laserbeam-permeable member, said head unit is disposed on a swing arm including an arm portion and signal detection devices for a disk recording medium, and a swing driving pivot is provided near an outer periphery of said disk recording medium disposed on said recording and reproducing apparatus.

14. The recording and reproducing apparatus according to claim 13, wherein said swing arm includes a first, disk-recording-medium side end and a second, opposite end, and a fulcrum of said swing arm is located at said swing driving pivot between said first and second ends, and said signal detection devices are fixedly provided at said second end.

15. The recording and reproducing apparatus according to claim 11, wherein said head unit includes a magnetic coil.

16. The recording and reproducing apparatus according to claim 1, wherein detection of a tracking signal is carried out by way of a pre-pit embedded in the recording medium.

* * * * *